(12) United States Patent
Clinch et al.

(10) Patent No.: US 8,225,479 B2
(45) Date of Patent: *Jul. 24, 2012

(54) METHOD FOR JOINING TWO OBJECTS AND CORRESPONDING JOINING ELEMENT

(75) Inventors: Colin Clinch, Basingstoke (GB); Marcel Aeschlimann, Ligerz (CH); Laurent Torriani, Lamboing (CH); Elmar Mock, Salvan (CH)

(73) Assignee: Woodwelding AG, Stansstad (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/102,354

(22) Filed: May 6, 2011

(65) Prior Publication Data

US 2011/0206448 A1   Aug. 25, 2011

Related U.S. Application Data

(62) Division of application No. 11/571,633, filed as application No. PCT/CH2005/000385 on Jul. 6, 2005, now Pat. No. 7,950,129.

(30) Foreign Application Priority Data

Jul. 7, 2004  (EP) .................................. 04405429

(51) Int. Cl.
*B21J 15/02* (2006.01)
(52) U.S. Cl. ........ 29/525.05; 29/505; 29/521; 29/522.1; 29/525.01; 403/270
(58) Field of Classification Search .................... 29/505, 29/521, 522.1, 525.01, 525.05; 403/270
See application file for complete search history.

(56) References Cited

U.S. PATENT DOCUMENTS

| 3,184,353 | A | * | 5/1965 | Balamuth et al. ............. 156/73.1 |
| 4,320,984 | A | * | 3/1982 | Mayer et al. ................... 403/292 |
| 5,310,434 | A | * | 5/1994 | Vives et al. ...................... 156/92 |
| 6,913,666 | B1 | * | 7/2005 | Aeschlimann et al. ....... 156/73.1 |
| 7,160,405 | B2 | * | 1/2007 | Aeschlimann et al. ....... 156/73.1 |
| 7,765,672 | B2 | * | 8/2010 | Clinch et al. ..................... 29/520 |
| 7,950,129 | B2 | * | 5/2011 | Clinch et al. ............... 29/525.01 |

FOREIGN PATENT DOCUMENTS

| EP | 0390685 | 10/1990 |
| FR | 2831229 | 3/1982 |
| WO | 96/01377 | 1/1996 |
| WO | 98/42988 | 10/1998 |
| WO | 00/79137 | 12/2000 |

\* cited by examiner

*Primary Examiner* — Derris Banks
*Assistant Examiner* — Azm Parvez
(74) *Attorney, Agent, or Firm* — Rankin, Hill & Clark LLP

(57) ABSTRACT

A first and a second object (1 and 2) are joined with the aid of a joining element (8) including at least in the region of its distal and proximal ends (8.1 and 8.2) a thermoplastic material. Two blind holes (5 and 6) facing each other are provided in the two objects (1 and 2) and the joining element (8) is positioned in the blind holes such that its distal and proximal ends (8.1) are in contact with the bottom faces of the blind holes and such that there is a gap (9) between the two objects (1 and 2). This assembly is then positioned between a support (3) and a sonotrode (4). The sonotrode (4) and the support (3) are forced towards each other, while the sonotrode (4) is vibrated, thereby liquefying at least part of the material having thermoplastic properties, there, where the joining element ends (8.1 and 8.2) are pressed against the bottom faces of the holes (5 and 6) and allowing the liquefied material to infiltrate into pores of the hole surfaces or unevennesses or openings provided in the hole surfaces.

16 Claims, 6 Drawing Sheets

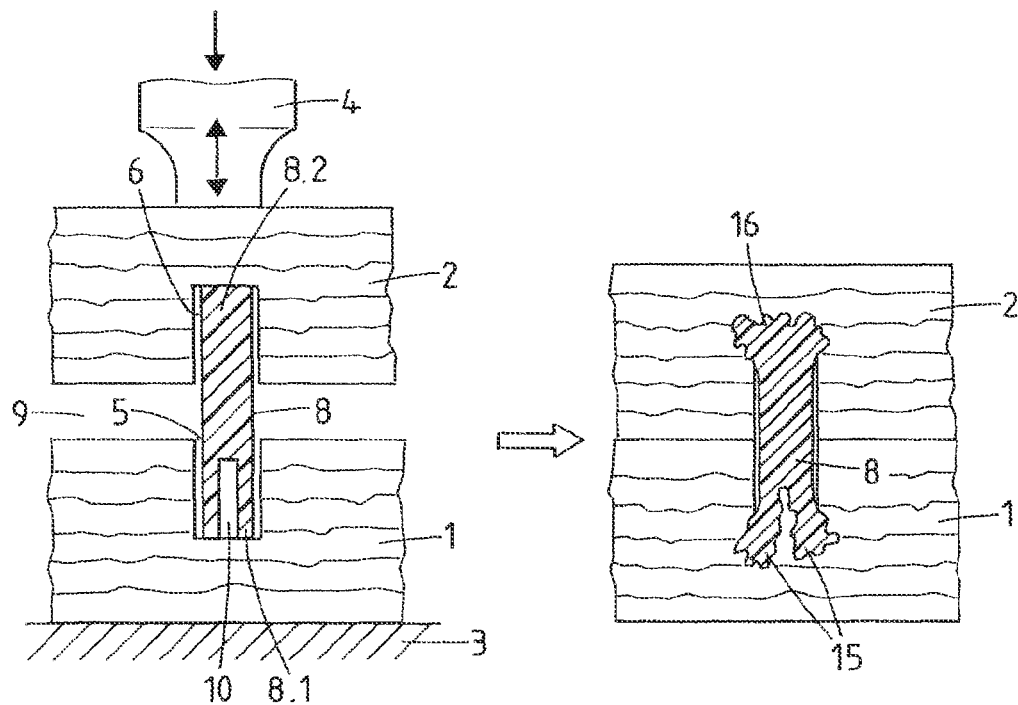
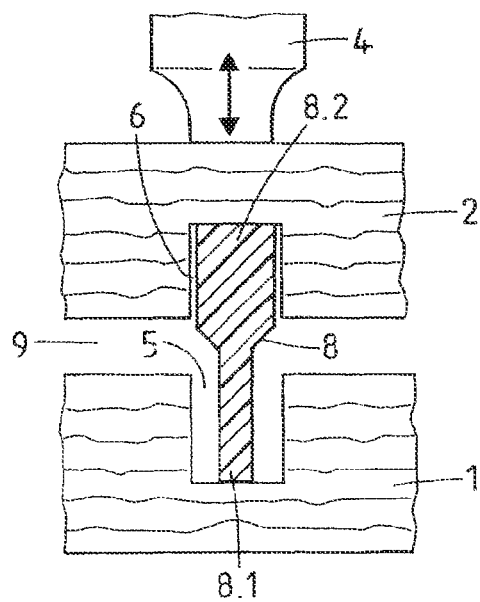
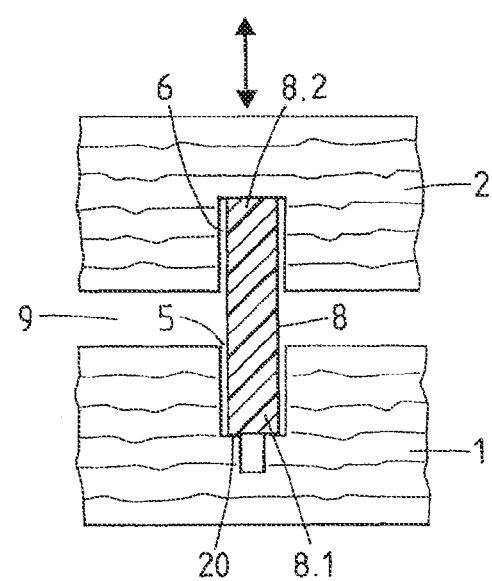
Fig. 1
Fig. 2
Fig. 3

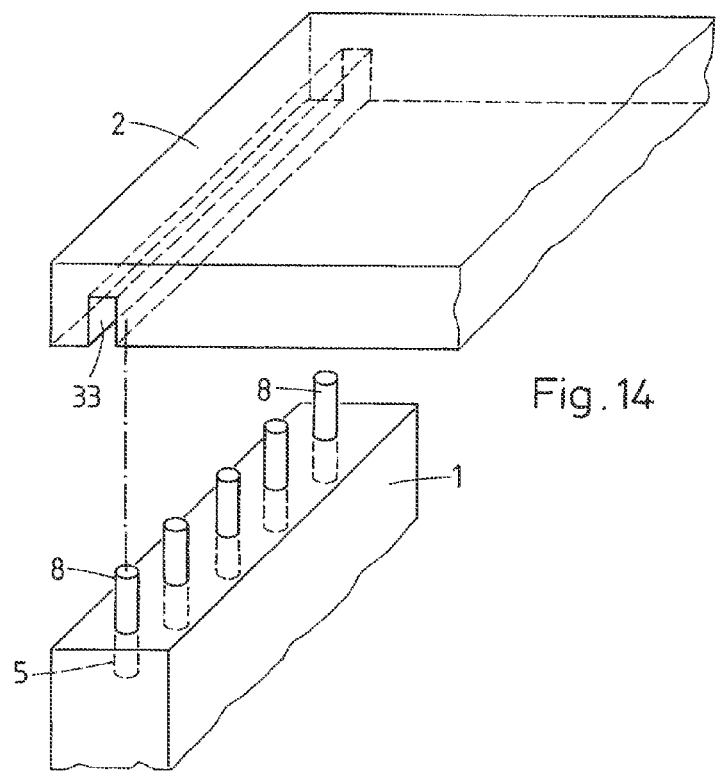
Fig. 14
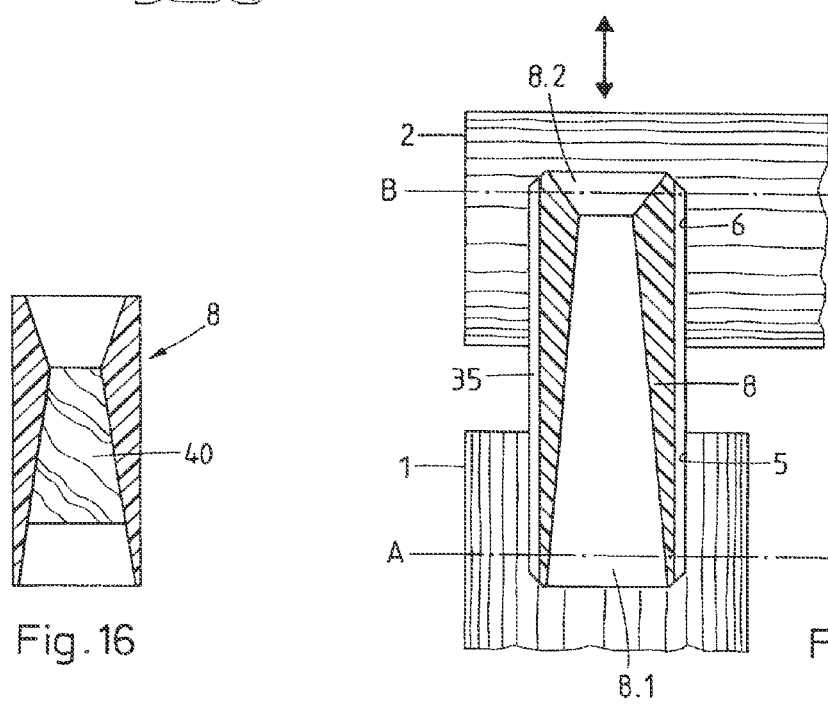
Fig. 16
Fig. 15

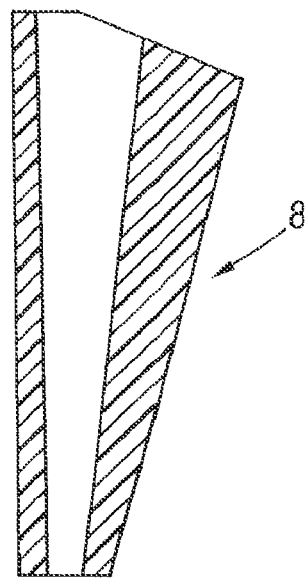
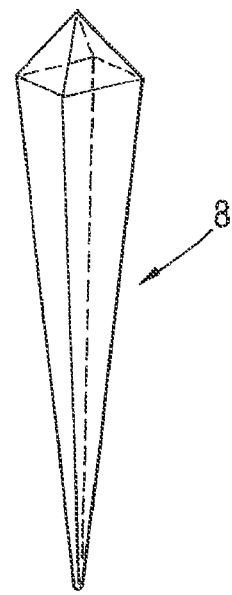
Fig. 17            Fig. 18
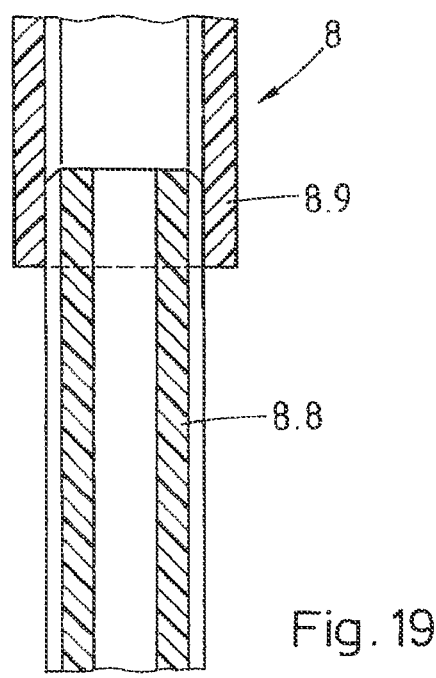
Fig. 19

METHOD FOR JOINING TWO OBJECTS AND CORRESPONDING JOINING ELEMENT

This application is a continuation of U.S. Ser. No. 11/571,633, filed on Jan. 25, 2007 and currently pending.

BACKGROUND OF THE INVENTION

1. Field of the Invention

The invention concerns a method for joining two objects and a corresponding joining element being applicable to the method, wherein the joining element consists at least partly of a material having thermoplastic properties and the method comprises the application of mechanical vibration, e.g. ultrasonic vibration.

2. Description of Related Art

Publications WO 98/42988 and WO 00/79137 describe joining elements which consist at least partly of a material with thermoplastic properties and which are, for example, pin-shaped. Such a joining element is anchored in an object of a porous material by positioning it in a blind hole provided in the object or by forcing it through the surface of the object and by then applying mechanical vibration (e.g. ultrasonic vibration) to the joining element while simultaneously pressing it further into the object. Due to the mechanical vibration, the thermoplastic material of the joining element is liquefied at the surface of the joining element where this surface is pressed against the porous material and, in its liquid state is pressed into the pores of the porous material where it forms an anchorage on re-solidification. In the anchorage area, the porous material is interpenetrated by the thermoplastic material such that it constitutes an intricate positive connection between the two materials. Application of the mechanical vibration is effected by positioning a vibrating element, e.g. the sonotrode of an ultrasonic device, on the joining element (e.g. on the end of a pin-shaped joining element), where it protrudes from the object in which it is to be anchored.

Publication WO 96/01377 describes a method for joining two objects of a porous material with the aid of a dowel-shaped joining element consisting at least partly of a material having thermoplastic properties and with the aid of mechanical vibration. In each one of the objects to be joined, a blind hole is provided and one end of the joining element is positioned in each one of the blind holes. The two objects are then pressed towards each other in a direction which is substantially parallel to a line connecting the two ends of the joining element and, simultaneously, one of the objects is excited with mechanical vibration.

According to WO 96/01377 the two blind holes and the two ends of the joining element are similar and the length of the joining element corresponds substantially to the total depth of the two blind holes. The two ends of the joining element and the two blind holes provided in the two objects are conical and the joining element and blind holes are dimensioned such that when positioning the joining element in the blind holes, the joining element does not reach to the bottom of the blind holes and therefore there remains a gap between the two objects. The joining action is carried out by positioning the assembly of the two objects and the joining element between a non-vibrating support and an element which is capable of being excited to mechanically vibrate, for example, the sonotrode of an ultrasonic device. The excitable element and the support are forced towards each other by e.g. pressing the excitable element onto one of the objects, and simultaneously, the excitable element is vibrated. On pressing and vibrating, the thermoplastic material of the joining element is liquefied where it is in contact with the walls of the blind holes and the joining element is forced deeper into the blind holes, whereby the gap between the parts is reduced. As soon as the gap is closed, no more pressure can be applied to the joining element and the joining action is therefore finished. The thermoplastic material which, during vibration, is liquefied infiltrates into the porous object material and anchors the joining element in the two objects.

With the above briefly described joining method according to the publication WO 96/01377 satisfactory results can be achieved in very specific cases only. In order to be applicable in a more general manner, it needs improvement.

BRIEF SUMMARY OF THE INVENTION

It is therefore the object of the invention to provide such improvement. This means, it is the object of the invention to create a joining method and a joining element for joining two (or possibly more than two) objects, wherein the joining element is used like a dowel, i.e. it is positioned in a recess provided between the two objects to be joined, e.g. in two opposite blind holes, wherein the joining element consists at least partly of a material having thermoplastic properties, wherein the method comprises the step of applying mechanical vibrations and wherein the joining element and the method according to the invention are to improve the dowel-like joining element and the corresponding joining method according to WO 96/01377 in such a way that, with their help, it becomes possible to satisfactorily join objects not only in very specific cases but much more generally.

This object is achieved by the joining method and the joining element as defined in the claims.

The invention is based on the finding that the strength of joints made according to the above mentioned joining method as described in publication WO 96/01377 is limited and that in most cases it is not possible to improve this strength by combining the teaching of WO 96/01377 with the teaching of WO 98/42988, i.e. by designing the joining element to be longer than the total of the depths of the two blind holes and by attempting to get a strong anchorage in the region of the two ends of the joining element. In most cases this is due to the fact that either the joining element is anchored in the object facing the excitable element in a satisfactory way while anchorage in the other object is not satisfactory, or the joining element end in the object facing the excitable element or the material surrounding this joining element end suffers from overheating, while anchorage in the other object is either satisfactory or not even satisfactory. These findings can be explained at least partly by the fact that the vibration energy available at the proximal end of the joining element (end facing the excitable element) is greater than at the distal end of the joining element (end facing the non-vibrating support) and that therefore less material will be liquefied at the distal end than at the proximal end. This effect needs to be counterbalanced if it is not to render the joint quality unsatisfactory e.g. by unsatisfactory anchorage at the distal joining element. The named energy asymmetry is due to several factors, of which only two are named. It is due to the proximal end of the joining element being positioned nearer to the source of the vibration than the distal end (less damping). It is further due to the need of the mechanical vibration to reach the distal joining element end by being transmitted through the joining element itself, wherein the characteristics for vibration transmission are not optimal, particularly when there is liquefied material at the proximal end of the joining element.

One obvious way for preventing the above named asymmetry consists in joining the two objects with the help of the joining element in two steps, namely positioning the joining element in the recess of the one of the objects and anchoring it in this recess according to the teaching of the publication WO-98/42988 and then to position the second element on the proximal end of the joining element and applying the vibrational energy to the second object for anchoring the joining element in the second object also. However, such two step method needs more time for the complete joining action and more complicated devices if it needs to be carried out fully automatically. Therefore, such two step method is not the inventive solution to the problem.

The quality, in particular the mechanical strength of an anchorage effected by mechanical vibration as described above, depends in particular on how much and how deeply thermoplastic material infiltrates into pores or other suitable openings in the material in which a joining element is to be anchored. This feature not only depends on the method parameters such as applied pressing force, vibrational energy (dependent on amplitude and frequency) being coupled into the system and time during which the vibrational energy is applied, but it also depends to a considerable degree on the joining element and recess being provided for the joining element between the objects, in particular on the design of the surfaces of joining element and recess being pressed against each other, on the resistance which the object material raises against being interpenetrated, displaced and/or compressed by the liquefied material, and on the capability of the joining element to be vibrationally coupled to the excited element and to transmit such vibration.

According to the invention the effect of the above named asymmetry regarding vibration energy available at the two joining element ends during the joining action is counterbalanced by at least one of the following measures:

The two ends of the joining element are different with regard to design and/or material, e.g., regarding the size of the two joining element faces which are pressed against the recess surfaces, regarding the amount of material having thermoplastic properties being available for liquefaction and/or regarding the thermoplastic properties of this material (asymmetric joining element);

The two recess faces against which the joining element ends are pressed (e.g. bottom faces of the two blind holes) are different with regard to design and/or material, e.g., regarding the size of the two recess faces against which the joining element ends are pressed and/or regarding resistance against interpenetration, compression and/or displacement by the liquefied material (asymmetric recess bottom faces);

The joining element is designed to allow improved coupling of mechanical vibration from the object facing the excitable element during at least part of the joining action (asymmetric anchoring action).

By applying at least one of the above named measures and therewith adapting the joining element and/or the recess provided for the joining element, it becomes possible to achieve satisfactory joints for a much wider range of applications than is possible by using the teaching of the publication WO 96/01377. However, for each different application, experiments are to be carried out to find optimum conditions for achieving a joint as desired.

BRIEF DESCRIPTION OF THE DRAWINGS

The following Figures show the method according to the invention and exemplary embodiments of joining elements to be used in the method. Therein:

FIG. 1 shows the method according to the invention on an exemplary embodiment of a joining element and objects to be joined, wherein an asymmetric joining element is used in connection with a symmetric recess (two identical blind holes);

FIGS. 2 to 9 show further exemplary embodiments of asymmetric joining elements used in connection with a pair of identical blind holes (symmetric recess bottom faces) or symmetric joining elements used in connection with a pair of non-identical blind holes (asymmetric recess bottom faces) or a combination thereof;

FIG. 14 shows an embodiment of the method according to the invention using a plurality of pin-shaped joining elements in connection with, on the one hand, a plurality of blind holes and, on the other hand, a groove;

FIG. 15 shows in detail an asymmetric joining element which is particularly suited for joining two wooden boards or chipboard elements to form a corner;

FIG. 16 shows the joining element according to FIG. 15 and further comprising a core;

FIG. 17 shows a further joining element similar to the one of FIG. 15;

FIGS. 18 and 19 show two further joining elements whose effect is similar to the effect of the joining element according to FIG. 1.

DETAILED DESCRIPTION OF THE INVENTION

Figure 4:
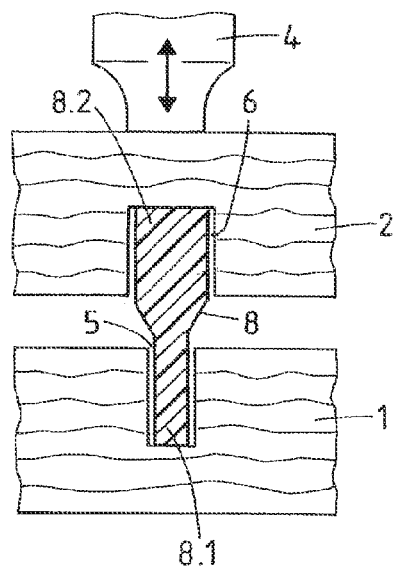

FIG. 1 shows the method according to the invention using a first exemplary embodiment of an asymmetric joining element and a pair of identical blind holes (identical regarding bottom face, not necessarily regarding depth) provided as recess between the two objects to be joined. Joining element and objects to be joined are shown in section parallel to the direction of the applied pressing force, i.e. parallel to a line connecting the proximal and the distal joining element ends. The two objects are e.g. wooden boards or chipboard elements or consist of another porous material. The assembly is shown both before application of pressure and vibration (left hand side) and after application of pressure and vibration (right hand side).

For joining the two objects 1 and 2, they are positioned between a support 3 and an excitable element 4 (e.g. sonotrode of an ultrasonic device), the first object 1 on the side of the support 3 and the second object 2 on the side of the excitable element 4. The two blind holes 5 and 6 provided, one in each object are facing each other, and the joining element 8 is positioned in the blind holes 5 and 6, its distal end 8.1 sitting on the bottom face of blind hole 5 in the first object 1, its proximal end 8.2 sitting on the bottom face of blind hole 6 in the second object 2. As the joining element 8 is longer than the total depths of the two blind holes 5 and 6, there remains a gap 9 between the two objects 1 and 2. As mentioned above, the two blind holes 5 and 6 may have the same depth or different depths.

The joining element 8 as shown in FIG. 1 consists of a material having thermoplastic properties and has a distal end

8.1 which differs from its proximal end 8.2 by a distal bore 10 rendering the distal face area smaller than the proximal face area and rendering the amount of material having thermoplastic properties smaller at the distal end than at the proximal one. When the excitable element 4 is vibrated (double arrow) and pressed on the second object 2 (single arrow), the vibration is coupled to the second object 2 to cause liquefaction of the thermoplastic joining element material in the area of the proximal end face of the joining element. Such liquefaction will lessen the vibrational energy coupled into the joining element 8 and thus reduce the vibrational energy available at the distal end face to effect liquefaction. This effect is compensated by the distal end face being smaller than the proximal end face resulting in a larger distal pressing force per unit area which facilitates liquefaction of the thermoplastic material at the distal end and helps to equalise interpenetration of liquefied thermoplastic into the porous material of the first object 1 as compared to interpenetration into the porous material of the second object 2 at the proximal joining element end. This means that at the proximal end 8.2 of the joining element 8 more vibrational energy for liquefaction is available but there is less pressure per unit area for pressing the thermoplastic material into the object material than is the case at the distal end 8.1 where there is less vibrational energy available but more force to press the material into the object. If the differing effects are balanced together with the method parameters (pressing force, vibration energy and application time), the resulting joint (right hand part of FIG. 1) comprises distal and proximal anchorage areas 15 and 16 of about the same strength, a result which cannot be achieved using a symmetric joining element in identical blind holes.

The joining element 8 of FIG. 1 consists completely of a material with thermoplastic properties, e.g. of ABS (acryl-butyl-styrene) which may include strengthening fibers or whiskers. If, during vibrating, the whole joining element is warmed or, in the last instances of vibrating, is brought into a plastic state, it will then shrink upon cooling and create a tension which pulls the two objects against each other.

FIG. 2 shows a further exemplary embodiment of a joining element comprising a proximal end face which is larger than the distal end face. The joining element 8 is shown positioned in two identical blind holes (before application of pressure and vibration). Same elements are designated with same reference numerals as in FIG. 1. Instead of a central distal bore 10 as shown in FIG. 1, the embodiment according to FIG. 2 comprises two (or more) coaxial cylindrical portions, wherein the distal portion has a smaller cross section than the proximal cross section and there is a step between the two sections.

FIG. 3 shows an embodiment of the method according to the invention (only shown before application of pressure and vibration) in which it is not the joining element which is asymmetric to achieve a larger pressure at the distal joining element end 8.1, but the recess bottom faces. The inner recess face against which the distal joining element end 8.1 is pressed is smaller than the inner recess face against which the proximal joining element end 8.2 is pressed. The joining element 8 has the form of a full or hollow cylinder, and therefore its distal end face is of an equal size as the proximal one, but it sits on a smaller surface area of the recess, namely only on a shoulder 20 thereof.

FIG. 4 shows a combination of the embodiments according to FIGS. 2 and 3, namely a stepped joining element 8 (proximal end face 8.2 larger than distal end face 8.1) positioned in two different blind holes (blind hole 5 in first object 1 with smaller bottom face than blind hole 6 in second object 2). The joining element 8 and the two objects 1 and 2 to be joined are shown before application of pressure and vibration.

Other embodiments of the inventive method in which the effective distal end face of the joining element 8 is reduced by a correspondingly reduced inner recess face, against which the distal end face of the joining element is pressed, may e.g. comprise a blind hole bottom face with a protruding cone or other protrusion on which a substantially even joining element end face sits.

Figure 5:
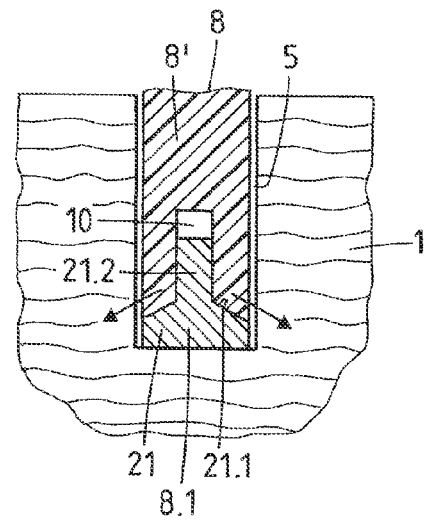

FIG. 5 shows another embodiment of the method according to the invention (only distal end 8.1 of joining element 8 in blind hole 5 of first object 1 shown; before application of vibration and pressure) in which again the effective distal face area of the joining element 8 is smaller than the proximal one. Here the joining element 8 comprises a distal insert 21 of a material which is not liquefiable and preferably not porous or considerably less porous than the object material and which distal insert constitutes the distal end face of the joining element. Facing towards the proximal end of the joining element 8, the distal insert 21 comprises a cross section reduction e.g. in form of a shoulder 21.1 and a connecting part 21.2 having a cross section which is smaller than the distal end face. The connecting part 21.2 reaches into a central bore 10 of a joining element rest part 8' being made of the material having thermoplastic properties, wherein the connecting part 21.2 of the insert is held in bore 10 by e.g. a press fit. Bore 10 is preferably longer than the connecting part 21.1.

On application of pressure and vibration, the distal insert 21 acts as the bottom face of the blind hole 5, wherein, on the side of the joining element 8, the distal face area is reduced by the central bore 10 and, on the side of the hole, the shoulder 21.1 only counteracts the pressing force. The material being liquefied at the distal end of the joining element infiltrates sideways (arrows) into the material of the first object 1. This means that the embodiment according to FIG. 5 is a combination of the embodiment according to FIG. 1 and the embodiment according to FIG. 4, wherein the advantage of this embodiment is the fact that there is less empty space into which the liquefied material can be pressed without much resistance and without anchorage effect and still the blind hole can have a cylindrical form which is the easiest one to be realized.

Figure 6:
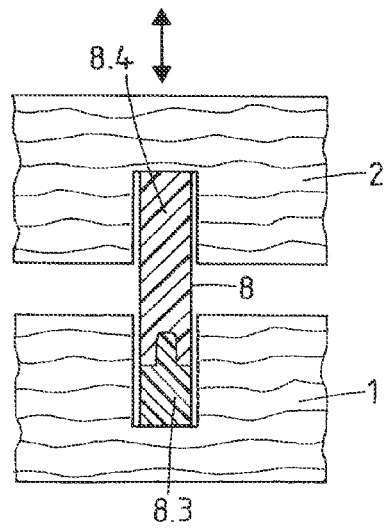

FIG. 6 shows a further embodiment of the method according to the invention (only shown before application of pressure and vibration) in which the joining element 8 is asymmetric regarding the thermoplastic properties of the material. This joining element is used in connection with two identical blind holes (symmetric recess). The asymmetric joining element 8 comprises a distal part 8.3 and a proximal part 8.4 wherein the distal part comprises a first material having thermoplastic properties and the proximal part comprises a second material having thermoplastic properties and wherein liquefaction of the first material can be effected with less energy than liquefaction of the second material (first material having a lower liquefaction temperature than second material), such that about the same amount of material is liquefied with the lesser vibration energy available at the distal end of the joining element in comparison with the material liquefied by the greater vibration energy available at the proximal end thereof. The joint achieved with this method shows equal qualities of the anchorage at the distal and proximal end of the joining element.

A similar effect as achieved with the joining element according to FIG. 6 can be achieved with a joining element having identical distal end and proximal end geometries but in which the thermoplastic material at the distal end is porous, while the thermoplastic material at the proximal end is nonporous (or more porous against less porous), or in which the thermoplastic material at the distal end has a smaller density than at the proximal end, or in which the thermoplastic material at the distal end contains more of a non-thermoplastic filling material than at the proximal end (or contains such filling material against no filling material).

Figure 7:
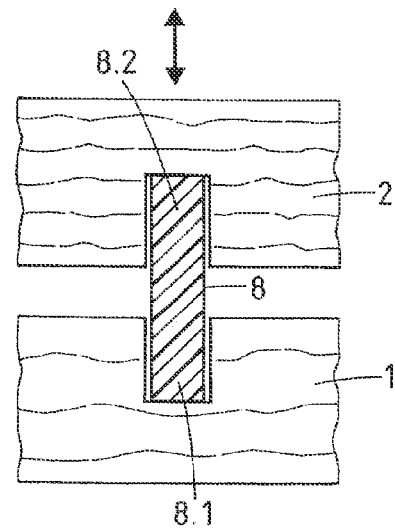

FIG. 7 shows a further embodiment of the method according to the invention (only shown before application of pressure and vibration), in which the two object materials in the region of the recess surfaces constitute the necessary asymmetry by having different properties regarding resistance against interpenetration, compression and/or displacement by the liquefied material. The material of the first object 1 has a higher porosity and/or a lesser mechanical stability than the material of the second object 2. The joining element 8 is symmetric and consists of a material having thermoplastic properties. Due to the difference in the object materials, a higher percentage of the lesser amount of liquefied material available at the distal joining element end infiltrates into the material, while at the proximal end, there is more liquefied material of which, due to the higher resistance presented by the object material, a lesser percentage infiltrates into the object material. This again leads to a symmetric joint showing anchorage of about the same strength at the distal and proximal ends of the joining element 8. The object material difference does not necessarily include the whole of the two objects. It is sufficient if the two object materials show the named differences in the area of the recess, where the joining element ends 8.1 and 8.2 are pressed against the object material.

Figure 8:
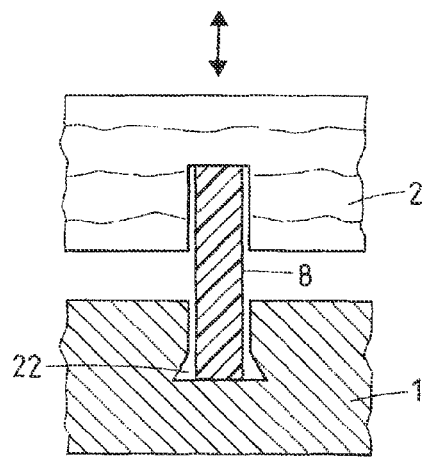

FIG. 8 shows a further embodiment of the method according to the invention (shown only before application of pressure and vibration) which works on the same principle as the embodiment according to FIG. 7. Here, the material of the first object 1 is substantially non-porous but the recess in this object is provided with suitable geometries as e.g. undercuts 22 into which the liquefied material infiltrates and constitutes a positive fit connection when re-solidified. Such geometries present less resistance against being filled with liquefied material or necessitate less liquidity of the material than the pores of the material of the second object 2, which effect again counterbalances the effects of the lesser vibration energy available at the distal joining element end. Of course, for certain applications it may be necessary to reverse the asymmetric materials, i.e. to have the less-porous or nonporous material with positive-fit geometries on the proximal side, and the more-porous material on the distal side, possibly with other asymmetric characteristics to permit a bond with satisfactory strength on the distal side. However, the same principle of positive-fit bond geometry in a less-porous or nonporous material applies.

Figure 9:
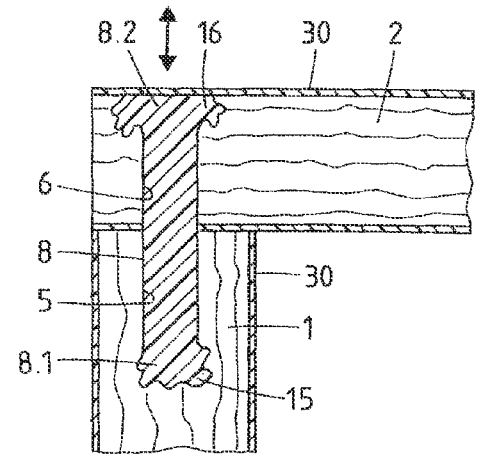

FIG. 9 shows a further embodiment of the method according to the invention (shown only after application of pressure and vibration) which again works in the same way as the embodiments shown in FIGS. 7 and 8. The two objects 1 and 2 are chipboard elements being coated with a compact layer 30 of e.g. melamine, wherein the chipboard elements are to be joined to form a corner, i.e. the blind hole extending parallel to the melamine layers in the first chipboard element 1 and perpendicular to them in the second one 2. The blind hole 6 in the second chipboard element 2 has a depth such that it reaches substantially to just underneath the opposite melamine layer 30, such having a bottom face which is not porous and which therefore cannot be interpenetrated nor displaced or compressed by the liquefied material. As seen from FIG. 9, the liquefied material infiltrates sideways into the chipboard material at the proximal joining element end 8.2 while at the distal joining element end 8.1 it infiltrates into the chipboard material much more in the direction of the pressing force.

Figure 10:
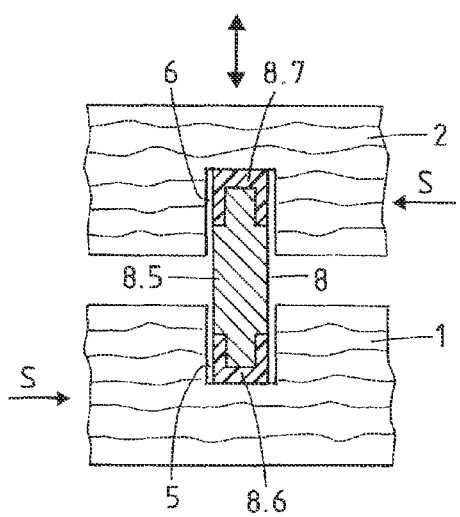
FIG. 10 shows a further embodiment of the method according to the invention in which the joining element is equipped for improved coupling capability (asymmetric joining action)

FIG. 10 shows a further embodiment of the method according to the invention (shown only before application of pressure and vibration) in which the asymmetry regarding the vibration energy available at the distal and proximal end of the joining element 8 is not counterbalanced by a further asymmetry of the joining element and/or the recess, but is counterbalanced by a design of the joining element 8 which improves transmission of mechanical vibration from the second object to the distal joining element end in a second phase of the joining action (asymmetric anchoring action). The joining element 8 comprises a central part 8.5 carrying a distal end cap 8.6 and a proximal end cap 8.7, the central part consisting of a substantially non-porous material being suitable for transmitting mechanical vibration (little damping) and the end caps 8.6 and 8.7 consisting of the material having thermoplastic properties. The end caps 8.6 and 8.7 are fixed to the central part 8.5 preferably by a positive fit connection (not shown). At least the proximal end cap 8.7 is designed with a minimum thickness of its face part such that it contains just enough material to constitute good anchorage in the second object 2 and to constitute a good connection with the central part 8.5.

On application of pressure and vibration to the assembly, as shown in FIG. 10, the material of the proximal end cap 8.7 is liquefied and infiltrates into e.g. pores of the second object 2 until the proximal end of the central part 8.5 abuts with the bottom face of blind hole 6. Such abutment and the effect of the pressing force will enhance transmission of vibration from the excitable element (not shown) via the second object 2 to the joining element 8 and in particular to its distal end where it will cause, in a second phase of the joining action, liquefaction of the distal end cap material 8.6.

If the central part 8.5 of the joining element 8 according to FIG. 10 is made of a material having a sufficient mechanical stiffness, this central part 8.5 also serves for improving stability of the effected joint against shearing forces (arrows S).

While the embodiments of the method as shown in FIGS. 1 to 9 rely on geometrical or material asymmetry of joining element and/or recess, the embodiment according to FIG. 10 relies on asymmetry regarding the anchoring action. The proximal and distal anchorages are not effected simultaneously, but at least partly in succession.

All embodiments shown in FIGS. 1 to 10 show two blind holes 5 and 6 being provided, one in each object. This is not a condition for the method according to the invention, which asks in a general sense for a recess to be provided between the two objects in which the joining element 8 is positioned such that its proximal and distal ends sit against inner recess faces and such that there remains a gap between the two objects.

Figure 11:
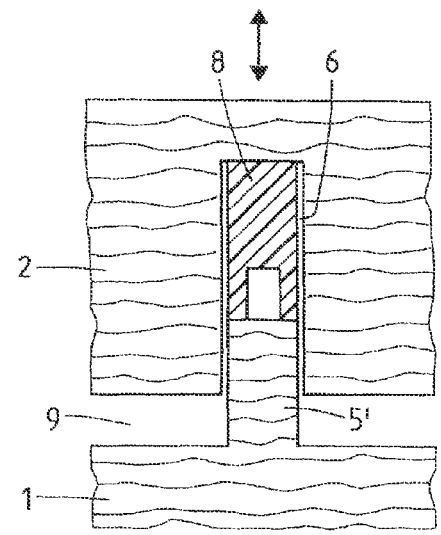
FIGS. 11 and 12 show embodiments of the method according to the invention in which the recess is not formed by a pair of blind holes.
Figure 12:
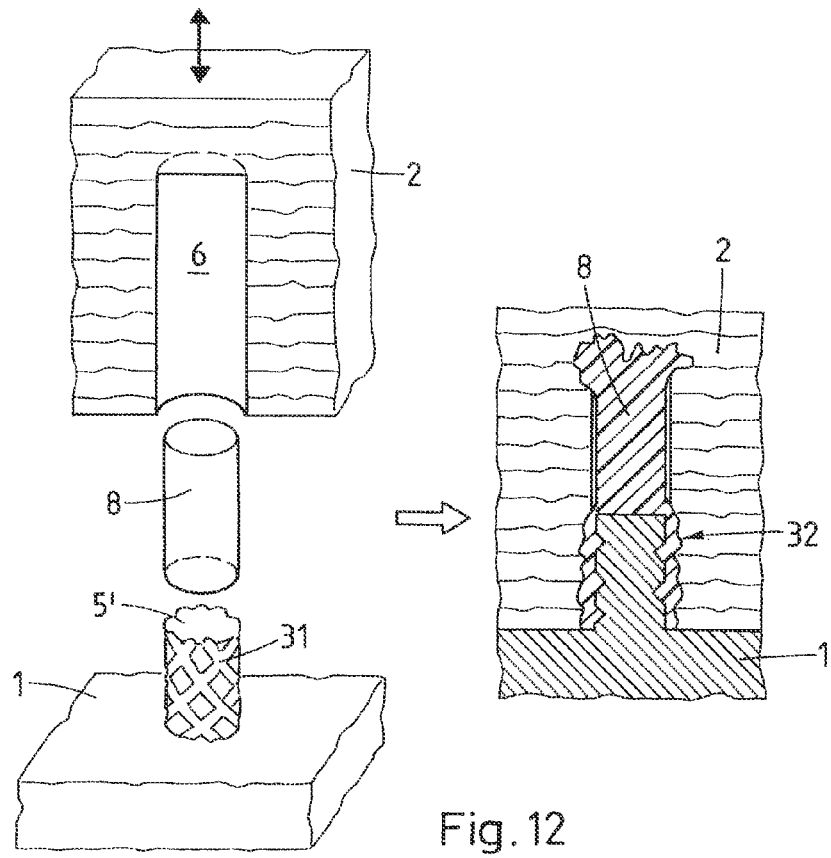

FIGS. 11 and 12 show further embodiments of the method according to the invention, wherein the recess to be provided between the two objects 1 and 2 is realized as one blind hole 6 in the second object 2 and a protrusion 5' on the first object 1, wherein hole 6 and protrusion 5' have matching cross sections. Depth of blind hole 6, height of protrusion 5' and length of joining element 8 are matched such that when the joining element 8 is positioned in the blind hole 6 and the protrusion 5' is positioned in the blind hole also, there remains a gap 9 between the two objects 1 and 2, which gap corresponds substantially with the amount of thermoplastic material to be displaced into the object material or into corresponding hollow geometries of blind hole 6 or protrusion 5'. Of course it is also possible to arrange the blind hole in the first object and the protrusion on the second object.

According to FIG. 11, which shows only the assembly of objects 1 and 2 and joining element 8 before application of pressure and vibration, both objects comprise a porous material and the joining element 8 has a distal end face smaller than its proximal one (method as shown also in FIG. 1). FIG. 12 shows on the left hand side object 1 with protrusion 5', symmetric joining element 8 and second object 2 with blind hole 6 to be assembled essentially as shown in FIG. 11 and on the right hand side the joint being effected by applying pressure and vibration to the assembly. The second object 2 comprises a porous material and the first object 1 a material with no pores or with substantially fewer pores than the material of the second object. Instead, the circumferential surface of the protrusion 5' is equipped with grooves 30, running e.g. in a criss-cross pattern and being open towards the protrusion face such that thermoplastic material being liquefied at the distal joining element face infiltrates into the grooves 31 and creates a positive fit connection between the walls of blind hole 6 and protrusion 5' as indicated with 32 on the right hand side of FIG. 12. As the joining element 8 in the present case is a symmetric one, care is to be taken that the resistance against liquefied material infiltrating into the grooves 31 remains smaller than the resistance of the second object material against interpenetration by the liquefied material. If this cannot be achieved, an asymmetric joining element is to be used (e.g. containing a central bore at its distal end).

In all the embodiments of the method according to the invention as shown in FIGS. 1 to 12, it is assumed that the joining element has the form of a pin whose cross section may be e.g. round, oval, square, rectangular, triangular or of any polygonic shape with straight, concave or convex sides. It proves to be advantageous to equip the circumferential surface of the joining element with axial ribs which contribute guidance of the joining element in the recess and which add to the connection strength at the joining element ends by providing additional anchorage material (greater area).

However, it is no condition of the method according to the invention that the joining element must be pin-shaped. All FIGS. 1 to 12, being sections parallel to the direction of the pressing force, can be understood also as cross sections through joining elements having a longitudinal extension perpendicular to the pressing force direction, i.e. having the form of tongues, and being positioned in groves having the same cross sections as the blind holes shown in FIGS. 1 to 10 or in one blind hole to be closed by a further tongue having the same cross sections as the blind holes and protrusions according to FIGS. 11 and 12.

Figure 13:
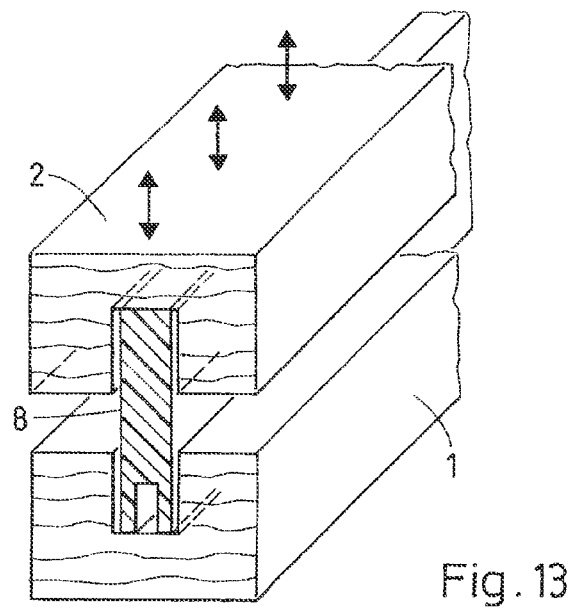
FIG. 13 shows an embodiment of the method according to the invention in which the joining element has the form of a tongue and the recess the form of a pair of grooves.

FIG. 13 shows such a tongue-shaped joining element being positioned in two opposite grooves (recess between objects to be joined). The illustrated method is substantially the same as the one illustrated by FIG. 1 (asymmetric joining element having smaller distal end face than proximal one). As indicated by the plurality of double arrows, it is advantageous to apply vibration to the whole length of object 2 in order to achieve homogeneous anchorage in the two objects over the whole length of the tongue-shaped joining element 8.

FIG. 14 illustrates a further way in which a similar joint is achieved as with the tongue-shaped joining element according to FIG. 13. The first object 1 is equipped with a row of blind holes 5 in which a plurality of substantially pin-shaped joining elements 8 are positioned. The second object 2 is equipped with a groove 33 dimensioned to accommodate the proximal ends of the joining elements. The second element is positioned for joining, is then laterally adjusted to fit exactly on the first object 1 and only then mechanical vibration is applied to the second object 2 for joining the two objects. The embodiment as shown in FIG. 14 is considerably less demanding regarding accuracy than an embodiment in which blind holes are provided in both objects for a plurality of joining elements, wherein corresponding blind holes in the two parts need to be aligned accurately in two directions.

FIG. 15 illustrates again the method as principally shown in FIG. 1 applied for joining two chipboard elements (objects 1 and 2) to form a corner element. As already shown in FIG. 9, the blind hole 5 in the first object 1 extends parallel to and about midway between the chipboard surfaces and blind hole 6 in the second object 2 extends perpendicular to the chip board surface and reaches beyond the middle of it. The density of chipboard is usually lower in a center region than in outer regions and its mechanical stability is greater in a direction perpendicular to the surfaces than parallel to them. For this reason there is a first asymmetry in the case shown in FIG. 14 regarding the object material, which for the first object 1 has a smaller mechanical stability and a higher porosity than for the second object 2. This asymmetry is more pronounced the more blind hole 6 reaches beyond the middle of the chipboard element representing object 2. However, the joining element 8 is designed to be asymmetric also. For improved mechanical stability as compared with the substantially compact joining elements according to the previous Figs., the present joining element 8 is designed as a cylindrical tube with an inner cross section to be larger at the distal end 8.1 than at the proximal end 8.2, thus rendering the ring-shaped distal face area smaller than the ring-shaped proximal face area and with more material having thermoplastic properties at the proximal end 8.2 of the joining element 8 than at the distal end 8.1. Depending on the object material, it proves advantageous to design the face areas not completely even (perpendicular to a joining element axis), but rather with a slope relative to a plane perpendicular to the joining element axis which slope forms a sharpened circular edge at the proximal and distal faces. This edge is pressed into the object material of the bottom face of the blind holes by the pressing force and initiates liquefaction. The effective face area is considered to be the one at the level (dash-dotted lines A and B) to which such initial pressing-in is effected.

The circumferential surface of the joining element according to FIG. 15 is equipped with axially extending ribs 35.

The joining element according to FIG. 15 can easily be manufactured by injection moulding. Its middle portion can easily be designed such that the centre of gravity is considerably displaced from a position at half axial length such that the joining element can be oriented correctly (proximal/distal) by gravity.

FIG. 16 shows a similar joining element 8 as FIG. 15, which in addition comprises a core 40 which is made of a material having more mechanical strength than the thermoplastic material of the outer joining element shell. The core 40 is e.g. made of wood and serves in particular for improving the joint stability against shearing forces. The core 4, if placed accordingly near to the proximal end of the joining element may also assume the function as discussed for the central joining element part 8.5 of the joining element according to FIG. 10.

FIG. 17 shows a further example of a joining element 8 according to the invention, which is similar to the embodiment as shown in FIGS. 15 and 16 but has a non-symmetrical cross section.

FIG. 18 shows a further example of a joining element 8 according to the invention. The joining element is in function similar to the joining elements as shown in FIGS. 1, 15, 16 and 17 (asymmetric geometry), but it is not hollow and has an angular (square or rectangular) cross section.

FIG. 19 shows a further example of a joining element 8 according to the invention. The joining element is in function similar to the joining elements as shown in FIGS. 15, 16 and 17, but it is designed to have an adjustable axial length. The joining element 8 comprises a distal part 8.8 and a proximal part 8.9, both having the form of a hollow cylinder wherein the distal part 8.8 has a smaller diameter and an outer thread and the proximal part 8.9 has a larger diameter and an inner thread adapted to the outer thread of the distal part 8.8. The length of the joining element 8 is adjusted by screwing the distal part 8.8 correspondingly far into the proximal part 8.9. Instead of the threads, the two joining element parts 8.8 and 8.9 can be equipped with snap elements such that they can be snapped together in a plurality of different axial positions.

We claim:

1. A method for joining a first and a second object with the aid of a joining element comprising at least in the region of a distal end and a proximal end a material having thermoplastic properties, the method comprising the steps of:
    providing a recess between the two objects to be joined,
    positioning the joining element into the recess such that its distal end is in contact with a recess bottom face in the first object, that its proximal end is in contact with a recess bottom face in the second object and that there is a gap between the two objects,
    positioning the first object against a support and positioning an element capable of being excited to vibrate mechanically against the second object,
    forcing the excitable element and the support towards each other in a direction to compress the joining element between its proximal and distal ends and to close the gap, while exciting the excitable element to vibrate mechanically, thereby liquefying at least part of the material having thermoplastic properties, there, where the joining element ends are pressed against the recess bottom faces and allowing the liquefied material to infiltrate into pores of the recess surfaces or unevennesses or openings provided in the recess surfaces, such anchoring the joining element ends in the objects,
    wherein for achieving suitably similar anchorage qualities at the two joining element ends, the distal end of the joining element is different from the proximal end and/or the recess bottom face in the first object is different from the recess bottom face in the second object, wherein the differences are design differences or material differences.

2. The method according to claim 1, wherein a face area of the proximal joining element end is larger than a face area of the distal joining element end and the amount of material having thermoplastic properties is larger at the proximal joining element end than at the distal joining element end.

3. The method according to claim 1, wherein the distal joining element end comprises a material which is liquefiable at a lower temperature than the material at the proximal joining element end.

4. The method according to claim 1, wherein the distal joining element end comprises a material which is more porous, which has less density, or which is filled to a higher degree with a non-thermoplastic filling material than the material of the proximal joining element end.

5. The method according to claim 1, wherein the joining element comprises a distal insert and a joining element rest part, wherein the joining element rest part comprises the material with thermoplastic properties and the distal insert is made of an essentially non-porous material and represents the distal end of the joining element, wherein the distal insert has a decreasing cross section towards the proximal joining element end and is fastened in a central opening of the joining element rest part.

6. The method according to claim 1, wherein, of the recess bottom faces against which the joining element ends are pressed, the one in the first object is smaller than the one in the second object.

7. The method according to claim 6, wherein the recess bottom face in the first object comprises a shoulder against which the distal joining element end is pressed.

8. The method according to claim 1, wherein the material surrounding the two recess bottom faces against which the joining element ends are pressed are different regarding resistance against interpenetration, compression and/or displacement by the liquefied material, wherein the material of the first object is more easily penetrated and/or compressed or displaced than the material of the second object.

9. A joining element suitable for joining two objects using a method according to claim 1, the joining element being pin-shaped or tongue-shaped and comprising a material with thermoplastic properties, wherein the joining element comprises a distal end and a proximal end, wherein design and/or material of the distal and proximal ends are different.

10. The joining element according to claim 9, wherein a face of the distal joining element end is smaller than a face of the proximal joining element end and/or that the distal joining element end comprises less of the material having thermoplastic properties than the proximal joining element end.

11. The joining element according to claim 10, wherein the joining element comprises a distal part and a proximal part, both parts being designed as hollow cylinders, the distal part having a smaller diameter then the proximal part and that fixing means are provided for fixing the two parts together such that the joining element has an adjustable axial length.

12. The joining element according to claim 11, wherein the fixing means comprise an inner thread on the proximal part and an outer thread on the distal part.

13. The joining element according to claim 9, wherein the joining element is pin-shaped and substantially hollow and that the joining element comprises a thinner wall at the distal end than at the proximal end.

14. The joining element according to claim 9, wherein the joining element comprises a distal insert of a material having substantially no porosity, the distal insert having a cross section getting smaller towards the proximal joining element end and being fastened in a central opening of a joining element rest part comprising the material having thermoplastic properties.

15. The joining element according to claim 9, wherein the joining element includes a first material having thermoplastic properties at the distal end and a second material having thermoplastic properties at the proximal end, the first material being liquefiable at a lower temperature than the second material.

16. The joining element according to claim 9, wherein the joining element includes a first material having thermoplastic properties at the distal end and a second material having thermoplastic properties at the proximal end, the first material being more porous, less dense or more filled with a non-thermoplastic filler than the second material.

* * * * *